United States Patent [19]

Bonomo

[11] 4,401,242
[45] Aug. 30, 1983

[54] DUAL DELIVERY HOPPER DISCHARGE APPARATUS

[76] Inventor: Melvin E. Bonomo, 109 S. Regency, Bloomington, Ill. 61701

[21] Appl. No.: 255,642

[22] Filed: Apr. 20, 1981

[51] Int. Cl.³ ............................................. B65G 67/06
[52] U.S. Cl. .................................. 222/533; 222/478; 222/556; 193/17
[58] Field of Search .............. 222/478, 526, 527, 530, 222/533, 538, 536, 556, 557; 193/2 D, 2 R, 15, 17

[56] References Cited

U.S. PATENT DOCUMENTS

| 909,565 | 3/1908 | Dunn. | |
|---|---|---|---|
| 1,342,456 | 6/1920 | Nagel | 222/536 |
| 1,718,460 | 6/1929 | Hansen et al. | |
| 2,573,714 | 11/1951 | Karl | 298/7 |
| 2,675,947 | 4/1954 | Wynn | 222/505 |
| 2,947,568 | 8/1960 | Johnson | 296/35 |
| 4,360,305 | 11/1982 | Dorsch | 193/16 X |
| 4,372,730 | 2/1983 | Ladt | 222/536 X |

OTHER PUBLICATIONS

Little Red Wagon Brochure (3570R380) by M & W Gear.

*Primary Examiner*—Joseph J. Rolla
*Assistant Examiner*—Russell D. Stormer
*Attorney, Agent, or Firm*—Hosier, Niro & Daleiden

[57] ABSTRACT

A hopper discharge apparatus for delivering the contents of a hopper from a hopper side port to alternative delivery points directly under and alongside the hopper utilizing a center delivery chute for directing the hopper contents to the delivery point under the hopper and a side delivery chute for directing the hopper contents either to the delivery point alongside the hopper or to the center delivery chute. Both chutes are movable, optionally about a common pivot point, for storage when not in use.

14 Claims, 6 Drawing Figures

DUAL DELIVERY HOPPER DISCHARGE APPARATUS

BACKGROUND OF THE INVENTION

This invention relates generally to hopper discharge apparatus and, more particularly, to a hopper discharge apparatus for delivering the contents of the hopper from a side port toward alternative delivery points directly below the hopper and alongside it. In one particularly important embodiment, the invention is concerned with a discharge apparatus designed for attachment to a side delivery gravity flow grain box for unloading the grain alternatively onto a conveyor alongside the box or into a pit directly below it.

Hopper structures of myriad types are known for storing and dispensing granular materials such as grain, coal, powdered chemicals, etc. One common type of hopper structure which is particularly well suited for application of the present invention comprises an open-top vessel having an inclined floor and at least one sidewall with a port at the point where the floor joins the sidewall. Unloading this hopper is accomplished simply by opening the port, thereby permitting the material within the hopper to discharge through the port under the force of gravity, following the incline of the hopper floor. Usually a chute is affixed to the port to direct the material to a point alongside the hopper.

Modern mechanized farming operations typically utilize large hoppers, known as "grain boxes", to receive and store grain during harvest season. In one particularly important farming application, these grain boxes are mounted on a running gear or carriage and hauled alongside a combine as it moves through a field harvesting grain. As the grain is harvested by the combine it is propelled into the grain boxes which eventually are hauled from the fields to a grain elevator or other storage facility for unloading.

The two most popular types of carriage-mounted grain boxes in general usage are the side delivery box and the center delivery box. The center delivery box has opposite slanted floor portions meeting in a center port which releases the grain from directly below the box in a manner very similar to the way in which a typical railroad coal car is unloaded. The side delivery box utilizes the slanted floor and side port structure described earlier as being particularly well suited to the application of the present invention. These two types of grain boxes have come into popular usage because they work well with the typical unloading systems found at grain elevators: (1) pit dump (center delivery boxes) and, (2) side conveyor (side delivery boxes).

Unfortunately, a farmer who invests in either center delivery or side delivery boxes compatible with the particular unloading facilities of his grain elevator may find for a variety of reasons that he must unload his grain boxes at another facility which has the opposite type of unloading arrangement. This presents a serious dilema to the farmer, since there is, at present, no inexpensive and efficient manner for adapting the center delivery box for side conveyor delivery or the side delivery box for pit dump delivery. Furthermore, economic considerations as well as space limitations prevent most farmers from maintaining fleets of grain boxes of both designs. As explained further herein, the present invention offers the farmer one approach to meeting his dual delivery needs by relying solely upon side delivery boxes.

One solution which has been proposed for this delivery problem is shown in FIG. 1. The grain box of FIG. 1 includes a hopper 10 mounted on a running gear 12 with runner gear tires 14 and supporting truss 16. Hopper 10 includes a side port 18 opened and closed by side control wheel 20 and a bottom port 22 opened and closed by bottom control wheel 24. An open side delivery chute 26 is attached to the hopper just below side port 18. An open center delivery chute 28 is also attached to the hopper, just below bottom port 22.

The dual delivery grain box of FIG. 1 is shown containing a load of grain 30 being unloaded into a pit dump (not shown) below the running gear. In this mode of operation, side port 18 is closed and bottom port 22 is open, thereby permitting the grain to exit the hopper onto chute 28.

The dual delivery arrangement of FIG. 1 has a number of serious drawbacks. This arrangement requires both side and bottom ports which adds to the expense of the hopper. Also, operation of the bottom door is extremely inconvenient, since it lies below the hopper. Finally, and perhaps most importantly, this structure cannot be retrofitted to present single delivery boxes, and thus fails to solve the problems of the many farmers who find themselves with a grain box of one delivery type and a grain elevator requiring the opposite delivery.

In addition to the approach of the FIG. 1 dual delivery grain box, less sophisticated approaches to solving the delivery compatibility problem have been proposed. For example, farmers having side delivery boxes but center delivery requirements have simply swung the side chute up out of the way, and placed a flat board below the side port, angled to the pit dump. This approach, however, is very inefficient since grain bounces and slides off the board and is spilled onto the ground. Another very similar approach which has been suggested is to attach a deflector to the bottom of the side chute in such a way that, when the chute is swung up out of the way the deflector is moved into position below the port and pointed towards the center of the grain box. This has the same drawbacks as the simple flat board arrangement since grain is lost into the air or directed to locations short of the pit. Also, since the deflector must be very small to prevent interference between the deflector and the running gear when the side chute is in its side delivery position, the deflector is probably less efficient than the flat board arrangement.

SUMMARY OF THE INVENTION

Accordingly, an object of the present invention is to provide a hopper discharge apparatus for efficiently and conveniently delivering the contents of the hopper from a side port toward alternative delivery points directly under the hopper or alongside it.

Another object of the present invention is to provide a hopper discharge apparatus that can be conveniently retrofitted to existing side delivery hoppers to give them dual delivery capability.

Other objects and advantages of the present invention will be apparent from the discussion hereinafter.

The present invention is therefore directed to a hopper discharge apparatus for delivering the contents of a hopper from its side port towards alternative delivery points below the hopper. The discharge apparatus includes both a center delivery means and a side delivery means. The center delivery means directs the contents of the hopper towards a delivery point directly under the hopper whereas the side delivery means directs the hopper contents from the side port alternatively to a delivery point alongside the hopper or to the center delivery means.

The hopper discharge apparatus may therefore be operated in both a side delivery and a center delivery mode. In the side delivery mode, the center delivery means, which is typically a chute, is closed and out of the way and the side delivery means, typically also a chute, is in position below the hopper side port for delivery to a point alongside the hopper. In the center delivery mode, the side delivery chute is in an upstanding position opposite the port and the center delivery chute is opened and directed to the desired delivery point directly below the hopper. The side delivery chute thereby serves as a backstop to deflect the material coming out of the port onto the center delivery chute.

The present invention fulfills an important need in the art by enabling side delivery grain boxes to be readily adapted for delivering grain alternatively to points alongside the chute, such as a conveyor belt, or to points directly below the hopper, such as a pit dump.

The various features and advantages of the present invention will become apparent upon examination of the following specification and drawings, together with the claims. While the invention is described below in connection with preferred or illustrative embodiments, these embodiments are not intended to be exhaustive or limiting of the invention. Rather, the invention is intended to cover any alternatives, modifications and equivalents that may be included within its spirit and scope, as defined by the appended claims.

BRIEF DESCRIPTION OF THE DRAWINGS

The invention, together with further of its objects and attended advantages, will be best understood by reference to the following description, taken in conjunction with the accompanying drawings in which.

DESCRIPTION OF THE PREFERRED EMBODIMENT

Figure 2:
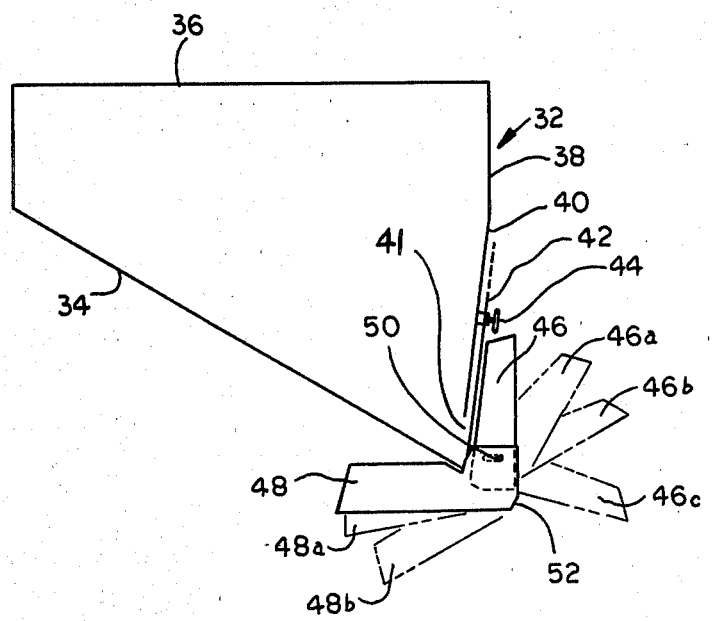
FIG. 2 is a schematic representation of a grain box including the discharge apparatus of the present invention, in which the details of the apparatus have been deleted and the movement of the side delivery and center delivery chutes has been illustrated in phantom lines.
Figure 3:
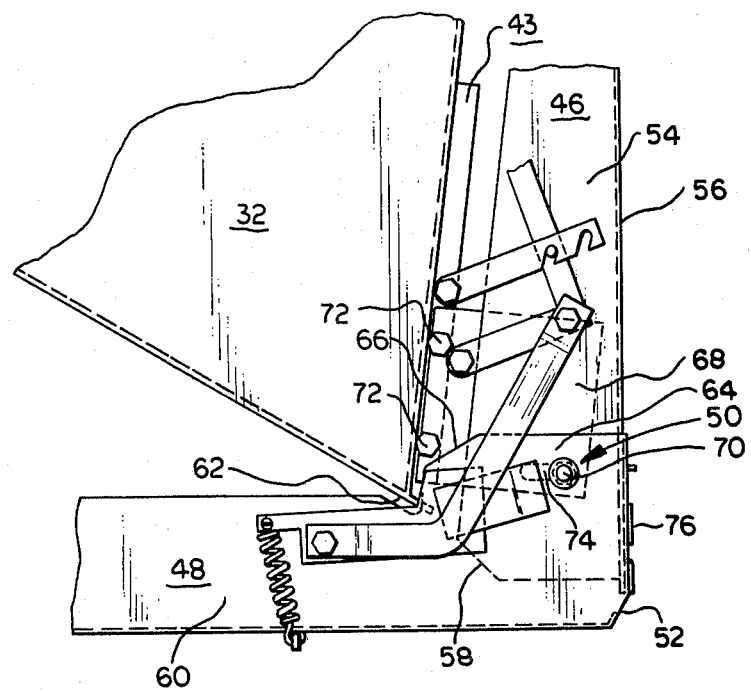
FIG. 3 is a fragmentary, enlarged view of the hopper discharge apparatus of the present invention, in which the side delivery chute is in its upstanding back-up position and the center delivery chute is in its closed position.

Turning now to the drawings, there is illustrated in FIG. 2 a harvest box 32 with slant floor 34, open top 36 and delivery side 38. Delivery side 38 includes an inwardly slanted base portion 40 containing a side delivery port 41 which is opened and closed with a door 42, represented diagramatically, mounted on slide channels 43 (FIG. 3). The door is operated by a control wheel 44 in a conventional rack and pinion arrangement.

A discharge apparatus including a side delivery chute 46 and a center delivery chute 48 is affixed to the hopper, adjacent the side port. The side delivery and center delivery chutes are movable about a common pivot 50. The side delivery chute can be swung out about pivot 50, through positions 46a, 46b and finally 46c. In position 46c, the side delivery chute rests in a side delivery position upon side chute support lip 52 of the center delivery chute.

Figure 4:
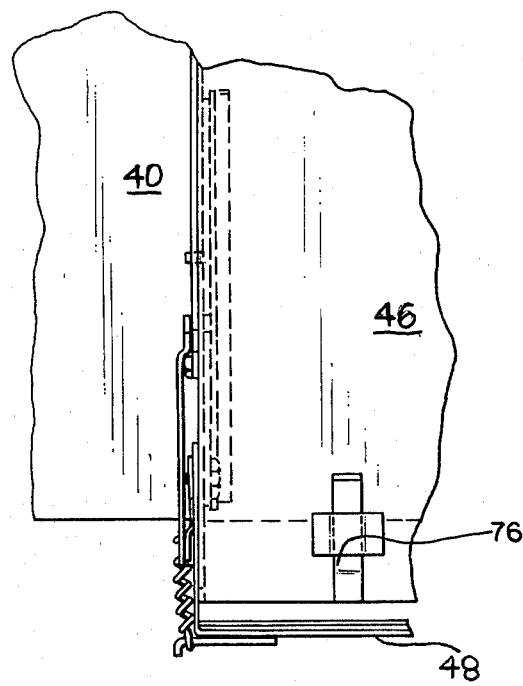
FIG. 4 is an enlarged fragmentary side view of the hopper discharge apparatus of the present invention as illustrated in FIG. 3.
Figure 6:
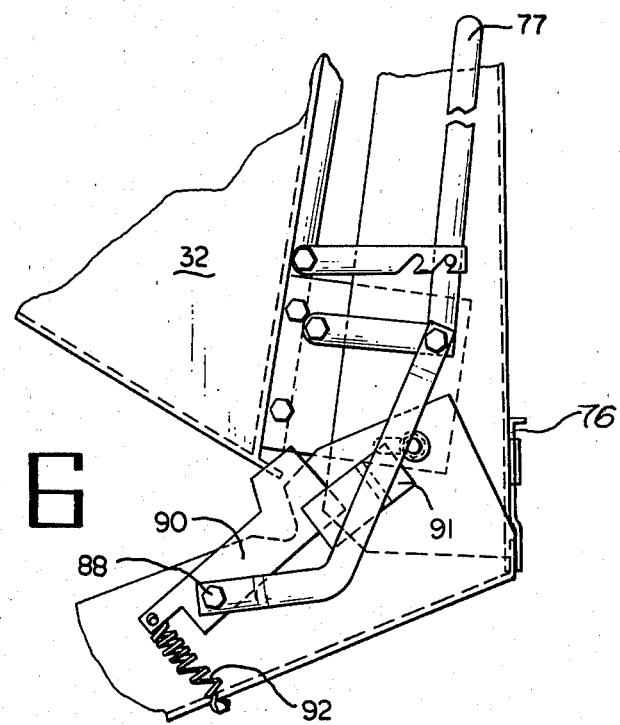
FIG. 6 is an enlarged fragmentary view of the hopper discharge apparatus of the present invention, in which the side delivery chute is in its upstanding back-up position and the center delivery chute is in its center delivery position.

The center delivery chute, in turn, rotates about pivot 50 through positions 48a and 48b where it comes to rest in its center delivery position against a movable bottom chute stop, as discussed further herein in connection with FIGS. 4 and 6.

Turning now to FIG. 3, the various components of the discharge apparatus are illustrated in greater detail. Side delivery chute 46 is of a typical elongated chute structure, with upstanding sidewalls 54 along each of its elongated edges 56. The shape of the upstanding sides 54 is dictated by space constraints, since this chute should be able to close up and out of the way against the hopper when not in use. The sidewalls include a bevel 58 to provide clearance with the side of the hopper when the chute is moved to its side delivery position.

Center delivery chute 48 is an elongated chute structure with upstanding sidewalls 60 and a side chute support lip 52 extending across the chute to support the side delivery chute in its side delivery position. Sidewalls 60 also include clearance cut-outs 62 which permit the center delivery chute to be moved up under the hopper, without interferring therewith. It is most important that the center delivery chute be movable to a position hugging the bottom of the hopper in order to prevent interference between the chute and the ground as the hopper is transported on its running gear.

Finally, the center chute sidewall includes a rearward portion 64 with bevel 66. Portion 64 overlaps sidewall 54 of the side delivery chute and provides an appropriate point of attachment of this chute at pivot 50.

The side delivery and bottom delivery chutes are mounted between opposed mounting brackets 68 by bolts 70 at common pivot 50. Bushings may be used here to facilitate movement of the chutes. The mounting brackets, in turn, are attached to slide channels 43 by bolts 72. In addition, side delivery chute 46 has a slot 74 at its point of attachment to bolt 70 to permit the side delivery chute to swing inwardly (in its upstanding position) to closely hug the side of the hopper, thereby reducing the overhang of the apparatus.

Side delivery chute 46 also includes an optional bottom chute stop 76, which is best seen in FIGS. 4 and 6. When this stop is in its lower position, it helps stop center chute 48 at the desired center delivery position 48b. However, the center chute may be freed for movement beyond this point, if needed, by sliding stop 76 upwardly and out of the way of the chute.

Figure 5:
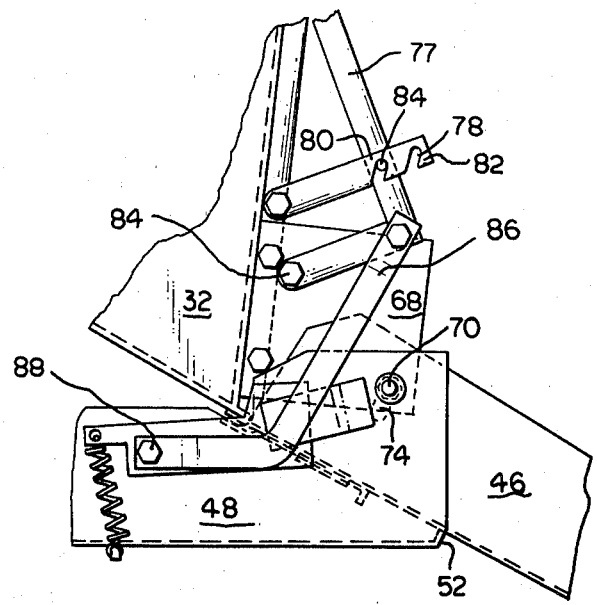
FIG. 5 is an enlarged fragmentary view of the hopper discharge apparatus of the present invention, in which the side delivery chute is in its side delivery position and the center delivery chute is in its closed position.

FIG. 5 illustrates the hopper discharge apparatus in its side delivery mode. In this mode of operation, side delivery chute 46 is in its side delivery position, resting on side chute support lip 52, with bolt 70 at the upper end of slot 74. Once delivery of the contents of the hopper is complete, the side delivery chute is swung upwardly to the position depicted in FIG. 3, with the lower portion of the chute moved up against the hopper side so that bolt 70 comes to rest in the bottom of slot 74. The chute is maintained in this upstanding position by conventional latch means (not shown).

Figure 1:
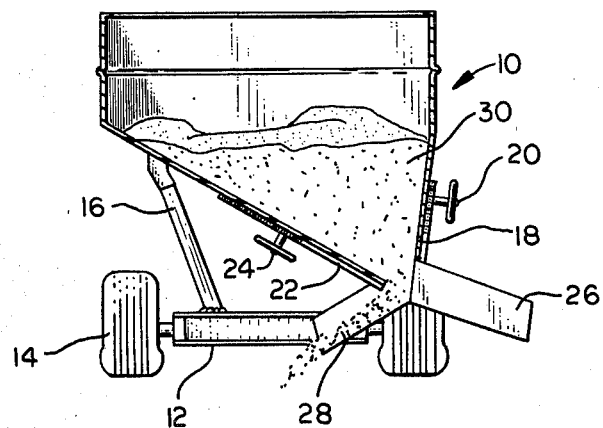
FIG. 1 is a front view of a dual delivery grain box of the prior art, mounted on a running gear.

The discharge apparatus may be moved into and out of its bottom delivery mode by operating control arm 77 between its open and closed positions. Since this control arm is conveniently located alongside the hopper for remote control of the center hopper, the operator need not crawl underneath to move the center chute, as in the FIG. 1 prior art apparatus. The open and closed positions of the control arm correspond to notches 78 and 80 in latch bar 82 which swings into and out of locking engagement with a pin 84 protruding from the control arm.

Control arm 77 is L-shaped, and is pivotably mounted to bracket 68 by bolt 84 at the distal end of its shorter leg. A control linkage 86 in turn is pivotally attached to control arm 77 at the junction between its shorter and longer legs. The other end of control linkage 86 is pivotally attached to center chute 48 by a bolt 88. Control arm 77 and control linkage 86 are configured and arranged so that movement of the control arm to its open position causes the center chute to drop to its center delivery position (FIG. 6) and return of the control arm to its closed position raises the center delivery chute back to its closed position (FIGS. 3 & 5).

A close examination of the center chute in its center delivery position (FIG. 6) reveals the presence of a back-up plate 90 (laterally confined by offset plate 91) which covers cut-out 62 of the center chute when the discharge apparatus is operating in the center delivery mode. This back-up plate prevents the material moving through the chute from escaping over the edge of the sidewall thus "grain-proofing" the apparatus. The back-up plate automatically pivots about bolt 88 under the urging of return spring 92, as the center chute is moved into its center delivery position. When the center chute is returned to its closed position, the back-up plate automatically moves back to its original position, out of the way of the corner of the hopper (FIGS. 3 & 5).

The present invention thus provides a simple and convenient dual delivery hopper discharge apparatus for delivering the contents of a hopper from a side port to delivery points alongside and directly under the hopper. This invention is particularly well suited for use with side delivery grain boxes, and may be installed as original equipment or in retrofit applications.

What is claimed is:

1. A hopper discharge apparatus for delivering the contents of a hopper from a hopper side port toward alternative delivery points below the hopper, comprising:

a center delivery chute having upstanding sidewalls along each of its edges for directing the contents of the hopper toward a delivery point directly under the hopper;

a side delivery chute having upstanding walls along each of its edges for directing the contents of the hopper from the side port alternatively to a delivery point alongside the hopper or to said center delivery means;

said center delivery chute being movable between a closed position and a center delivery position directed toward said delivery point directly under the hopper;

said side delivery chute being movable between an upstanding back-up position and a side delivery position directed toward said delivery point alongside the hopper; and said chutes being mounted for movement between their respective positions about a common pivot, whereby said hopper discharge apparatus may be placed alternatively in a side delivery mode with said center delivery chute in its closed position and said delivery chute in its side delivery position, and in a center delivery mode with said center delivery chute in its center delivery position and said delivery chute in its upstanding back-up position.

2. The hopper discharge apparatus of claim 1 wherein rearward portions of said side delivery chute sidewalls and said bottom delivery chute sidewalls overlap when the hopper discharge apparatus is in said bottom delivery mode to insure that the contents of the hopper are directed from said side port into said center delivery chute.

3. The hopper discharge apparatus of claim 1 wherein said bottom delivery chute sidewalls include clearance cut-outs enabling said bottom delivery chute to be moved into said closed position without interfering with the hopper, said hopper discharge apparatus further including means for covering said clearance cut-outs when said hopper discharge apparatus is in said bottom delivery mode to prevent the hopper contents moving through said bottom delivery chute from escaping through said clearance cut-outs.

4. The hopper discharge apparatus of claim 1 wherein said bottom delivery chute includes means for supporting said side delivery means at the desired delivery angle when said hopper discharge apparatus is in said side delivery mode.

5. The hopper discharge apparatus of claim 1 wherein said common pivot is fixed in relation to said hopper.

6. The hopper discharge apparatus of claim 5 wherein said side chute is mounted to said common pivot through opposing slots in its sidewalls, said slots permitting said chute to be moved into said upstanding delivery position in close proximity to the hopper, said slots further permitting said side chute to be alternatively positioned at a desired position for delivery to a point alongside the hopper.

7. The hopper discharge apparatus of claim 1 wherein the hopper includes protruding channels adjacent the side port and the hopper discharge apparatus includes a bracket for mounting said hopper discharge apparatus adjacent to the hopper side port, said bracket including means for attachment to the protruding channels.

8. The hopper discharge apparatus of claim 1 including remote control means disposed in proximity to the hopper port for moving said center delivery chute between said closed position and said delivery position, said control means including latch means for locking said center delivery chute alternately in said closed and in said open positions.

9. A hopper including means for delivering the contents of the hopper toward alternative delivery points below the hopper, comprising:

a hopper housing having a single port in an upstanding delivery side thereof and means for opening and closing said port;

discharge apparatus mounted opposite said port including a center delivery chute for directing the contents of the hopper toward a delivery point directly under the hopper and a cooperating side delivery chute for directing the contents of the hopper from the side port alternatively to a delivery point alongside the hopper or to said center delivery means, whereas said chutes are mounted for movement between their respective positions about a common pivot.

10. The hopper discharge apparatus of claim 9 wherein:

said center chute comprises an elongated center delivery chute having upstanding sidewalls along each of its elongated edges;

said side delivery chute comprises an elongated side delivery chute having upstanding walls along each of its elongated edges;

said center delivery chute being movable between a closed position adjacent the bottom of the hopper and a downwardly inclined delivery position directed toward said delivery point directly under the hopper, said side delivery chute being movable between an upstanding back-up position adjacent the side port and a downwardly inclined delivery position directed toward said delivery point alongside the hopper, whereby said hopper discharge apparatus may be placed in a side delivery mode with said center delivery chute in its closed position and said side delivery chute in its delivery position or a center delivery mode with said center delivery chute in its center delivery position and said side delivery chute in its upstanding back-up position.

11. The hopper discharge apparatus of claim 10 wherein rearward portions of said side delivery chute sidewalls and said bottom delivery chute sidewalls overlap when the hopper discharge apparatus is in said bottom delivery mode to insure that the contents of the hopper are directed into said center delivery chute, and said bottom delivery chute sidewalls include clearance cut-outs enabling said bottom delivery chute to be moved into said closed position without interfering with the hopper housing, said apparatus further including means for covering said cut-outs when said bottom delivery chute is in said bottom delivery mode.

12. The hopper of claim 10 wherein said chutes are mounted for pivotal movement about a common pivot, said pivot being spaced outwardly from said hopper delivery side.

13. An improved hopper discharge apparatus of the type having side delivery means for deliverying the contents of the hopper from a single port in an upstanding side of the hopper to a delivery point alongside the hopper wherein the improvement comprises:

center delivery means for directing the contents of the hopper toward a delivery point directly under the hopper and means associated with the side delivery means for directing the contents of the hopper from the side port alternatively to a delivery point alongside the hopper or to said center delivery means said side delivery means and said center delivery means include a pair of chutes each mounted for relative movement about a common pivot.

14. A hopper including means for delivering the contents of the hopper toward alternative delivery points below the hopper, comprising:

a hopper housing having a port in a delivery side thereof, means for opening and closing said port;

discharge apparatus mounted adjacent said side port including an elongated center delivery chute for directing the contents of the hopper toward a delivery point directly under the hopper, and, an elongated side delivery chute for directing the contents of the hopper from the side port alternatively to a delivery point alongside the hopper or to said center delivery chute, said center delivery chute being movable between a closed position adjacent the bottom of the hopper and a downwardly inclined delivery position directed toward said delivery point directly under the hopper, said side delivery chute being movable between an upstanding back-up position adjacent the side port and a downwardly inclined delivery position directed toward said delivery point alongside the hopper, said chutes being mounted for pivotal movement about a common pivot, whereby said hopper discharge apparatus may be placed in a side delivery mode with said center delivery chute in its closed position and said side delivery chute in its delivery position or a center delivery mode with said center delivery chute in its center delivery position and said side delivery chute in its upstanding back-up position.

* * * * *